Patented Nov. 2, 1937

2,097,675

UNITED STATES PATENT OFFICE 2,097,675

COLORING ACETATE ARTIFICIAL SILK

Cecil Shaw, Grangemouth, Scotland, assignor to Imperial Chemical Industries Limited, a corporation of Great Britain No Drawing. Application October 28, 1936, Serial No. 108,100. In Great Britain October 30, 1935

4 Claims. (Cl. 8—5)

This invention relates to the manufacture and application of new benzanthrone derivatives, namely Bz-1-alkoxy-benzanthrones, in which the alkoxy group has 2 to 5 carbon atoms.

British Patent No. 291,131 describes a process for the production of Bz-1-methoxybenzanthrone and derivatives thereof, which consist in treating a benzanthrone containing an interchangeable negative substituent in the Bz-1-position or a derivative thereof with methyl alcohol in the presence of an alkaline agent. The benzanthrone compounds exemplified are Bz-1-nitrobenzanthrone, 6-chloro-Bz-1-nitrobenzanthrone, 6:Bz-1-dinitrobenzanthrone, Bz-1-nitro-6-methyl-benzanthrone, 8-chloro-Bz-1-nitrobenzanthrone, Bz-1-chlorobenzanthrone, Bz-1-benzanthronesulphonic acid, 6:Bz-1-dibromobenzanthrone, 6:chloro-Bz-1-bromobenzanthrone, 6:Bz-1-dichlorobenzanthrone, Bz-1-chloro-6-nitrobenzanthrone, 8:Bz-1-dichlorobenzanthrone and Bz-1-chloro-6-methylbenzanthrone. It does not describe the manufacture of any alkoxy benzanthrones other than Bz-1-methoxybenzanthrones.

I have now found that Bz-1-alkoxybenzanthrones in which the alkoxy group has 2 to 5 carbon atoms may be readily obtained by treating Bz-1-hydroxybenzanthrone with corresponding alkyl esters of inorganic acids. In this way I have been able to obtain a series of new and valuable benzanthrone derivatives. Typical examples of Bz-1-alkoxybenzanthrones which may be manufactured according to the process of my invention include those in which the alkoxy group is the radical of a primary alcohol, e. g. ethoxy, n-propoxy, n-butoxy, or n-amyloxy group; those in which it is the radical of a secondary or tertiary alcohol, e. g. an isopropoxy, isobutoxy or tert. butoxy group; also those in which it is the radical of a substituted alcohol, e. g. β-chloroethoxy, β-hydroxyethoxy, β-methoxyethoxy and β-ethoxyethoxy. Where the substituent in a substituted alkoxy group is also an alkoxy group the number of carbon atoms in the latter must not be greater than 5. By esters of inorganic acids I include esters of hydrochloric, hydrobromic, sulfuric and substituted sulfuric acids. I do not include carboxylic acids. Specific esters are for example diethyl sulfate, ethyl p-toluenesulfonate, dipropylsulfate, ethyl bromide, ethyl chloride, ethyl benzenesulfonate, and glycol bis-(p-toluenesulfonate).

I have also found that the new benzanthrone derivatives are valuable intermediates for the manufacture of dyestuffs for cellulose acetate artificial silk, and this they color in brilliant yellow shades of good all-round fastness. Satisfactory yellow dyestuffs for cellulose acetate artificial silk have been lacking. One reason for this is that many otherwise good yellow dyestuffs have had the disadvantage of being phototropic. This disadvantage is absent from my new compounds.

One object of my invention is new benzanthrone derivatives, namely Bz-1-alkoxybenzanthrones, in which the alkoxy group has 2 to 5 carbon atoms. Another object is new intermediates for dyestuffs, and new dyestuffs for cellulose acetate artificial silk. Another object is a process for the manufacture of the above new substances. A further object is the application of the above-mentioned new dyestuffs for the coloring of cellulose acetate artificial silk. Other objects of my invention will appear hereinafter.

The following examples, in which parts are by weight, illustrate but do not limit the invention.

*Example 1.*—5 parts of Bz-1-hydroxybenzanthrone, 5 parts of dry sodium carbonate, and 50 parts of nitrobenzene are heated together to the boil for about half an hour in a vessel provided with reflux condenser to remove any traces of water and then cooled to 150° C. and 0.5 part of dry pyridine added. The temperature is then raised to 165° C. and 7.5 parts of diethyl sulfate added during half an hour with the temperature kept at 165–175° C. The mixture is then heated at 165–170° C. for a further 2 hours, allowed to cool and the insoluble material removed by filtration. The filtrates are steam distilled and the residue of Bz-1-ethoxybenzanthrone is filtered off and dried.

This compound is yellow and melts at 139–141° C. It dissolves in benzene with a pure yellow color and in concentrated sulfuric acid to give a solution which shows a red fluorescence and which appears blue in thin layers and crimson red in thick ones.

*Example 2.*—70 parts of Bz-1-hydroxybenzanthrone, 70 parts of dry sodium carbonate, 70 parts of β-chloroethyl p-toluenesulfonate and 700 parts of nitrobenzene are heated together at 160–165° C. for 8 hours in a vessel fitted with a stirrer and a reflux condenser. The mixture is then cooled and the insoluble material removed by filtration. The filtrates are steam distilled and the residue of Bz-1-β-chloroethoxybenzanthrone filtered off and dried. It is purified by recrystallization from benzene. The recrystallized compound is yellow and melts at 147.5–150° C. It dissolves in benzene and concentrated sulfuric acid giving similarly colored solutions to those given by the compound of Example 1.

*Example 3.*—80 parts of Bz-1-hydroxybenzanthrone, 80 parts of dry sodium carbonate, 80 parts of n-butyl p-toluenesulfonate, and 800 parts of nitrobenzene are heated together at 150–160° C. for 6 hours, in a vessel fitted with a stirrer and a reflux condenser. The mixture is then cooled and the insoluble material removed by filtration. The filtrates are steam-distilled and the residue of Bz-1-n-butoxybenzanthrone filtered off and dried. It is recrystallized from benzene. The recrystallized compound is yellow, and melts at 120–122° C. It dissolves in concentrated sulfuric acid to give a solution colored like that of the compound of Example 1.

*Example 4.*—80 parts of Bz-1-hydroxybenzanthrone, 80 parts of dry sodium carbonate, 80 parts of n-amyl p-toluenesulfonate (made by reacting equimolecular proportions of n-amyl alcohol and p-toluenesulfon chloride in pyridine solution at ordinary temperature) and 800 parts of nitrobenzene are heated together at 195–200° C. for 6½ hours, in a vessel fitted with a stirrer and a reflux condenser. The mixture is then cooled and the insoluble material filtered off. The filtrates are steam-distilled and the residue of Bz-1-n-amyloxybenzanthrone is filtered off and dried. It is purified by recrystallizing from benzene. The recrystallized compound is yellow, and melts at 133–135° C. It dissolves in benzene and concentrated sulfuric acid, giving similarly colored solutions to those given by the compound of Example 1.

*Example 5.*—70 parts of Bz-1-hydroxybenzanthrone, 70 parts of dry sodium carbonate, 70 parts of n-propyl p-toluenesulfonate and 700 parts of nitrobenzene are heated together at 160–170° C. for 8 hours in a vessel fitted with a stirrer and a reflux condenser. The mixture is then cooled and the insoluble material filtered off. The filtrate is steam-distilled and the residue of Bz-1-n-propyloxybenzanthrone filtered off and dried. It is purified by recrystallizing from benzene. The recrystallized compound is yellow and melts at 136–137° C. It dissolves in benzene and concentrated sulfuric acid, giving similarly colored solutions to those given by the compound of Example 1.

*Example 6.*—70 parts of Bz-1-hydroxybenzanthrone, 70 parts of dry sodium carbonate, 70 parts of isopropyl p-toluenesulfonate and 700 parts of nitrobenzene are heated together at 150–160° C. for 8 hours in a vessel fitted with a stirrer and a reflux condenser. The mixture is then cooled and the insoluble material filtered off. The filtrate is steam-distilled and the residue of Bz-1-isopropoxybenzanthrone filtered off and dried. The compound is yellow, and dissolves in concentrated sulfuric acid to give a solution with a red fluorescence and which appears red in thick layers and bluish-red in thin layers. It dissolves in benzene with a yellow color.

*Example 7.*—70 parts of Bz-1-hydroxybenzanthrone, 70 parts of dry sodium carbonate, 70 parts of isobutyl p-toluenesulfonate (made by reacting equimolecular proportions of isobutyl alcohol and p-toluenesulfon chloride in pyridine at ordinary temperature) and 700 parts of nitrobenzene are heated together at 150–160° C. for 8 hours in a vessel fitted with a stirrer and a reflux condenser. The mixture is then cooled and the insoluble material filtered off. The filtrate is steam-distilled and the residue of Bz-1-isobutoxybenzanthrone is filtered off and dried. It is purified by recrystallizing from benzene. The compound is yellow, and melts at 121–123° C. It dissolves in benzene and concentrated sulfuric acid giving solutions which show similar colors to those given by the compound of Example 6.

*Example 8.*—70 parts of Bz-1-hydroxybenzanthrone, 70 parts of dry sodium carbonate, 70 parts of glycol bis-(p-toluenesulfonate) and 700 parts of nitrobenzene are heated together at 140–150° C. for 8 hours in a vessel fitted with a stirrer and a reflux condenser. The mixture is then cooled and the insoluble material removed by filtration. The filtrate is steam-distilled and the residue of Bz-1-hydroxyethoxybenzanthrone filtered off, washed and dried. It is purified by recrystallizing from benzene. (The insoluble material which is removed on the first filtration appears to be a product of reaction of two molecules of Bz-1-hydroxybenzanthrone with one of the esters.) The recrystallized compound is yellow, and melts at 173–175° C. It dissolves in benzene and concentrated sulfuric acid giving solutions which show similar colors to those given by the compound of Example 6.

*Example 9.*—70 parts of Bz-1-hydroxybenzanthrone, 70 parts of dry sodium carbonate, 70 parts of β-methoxyethyl p-toluenesulfonate (made by interacting equimolecular proportions of ethylene glycol monomethyl ether and p-toluenesulfon chloride in pyridine at ordinary temperature) and 700 parts of nitrobenzene are heated together at 160–170° C. for 8 hours in a vessel fitted with a stirrer and a reflux condenser. The mixture is then cooled and the insoluble material filtered off. The filtrate is steam-distilled and the residue of Bz-1-β-methoxyethoxybenzanthrone is filtered off and dried. It is purified by recrystallizing from benzene. The recrystallized compound is yellow and melts at 139.5–142° C. It dissolves in concentrated sulfuric acid to give a crimson red solution with red fluorescence. Its benzene solution is yellow.

*Example 10.*—70 parts of Bz-1-hydroxybenzanthrone, 70 parts of dry sodium carbonate, 70 parts of β-ethoxyethyl p-toluenesulfonate and 700 parts of nitrobenzene are heated together at 160–170° C. for 8 hours in a vessel fitted with a stirrer and a reflux condenser. The mixture is then cooled and the insoluble material filtered off. The filtrate is steam-distilled and the residue of Bz-1-β-ethoxyethoxybenzanthrone is filtered off and dried. It is purified by recrystallizing from benzene. The recrystallized compound is yellow and melts at 132.5–133.5° C. It dissolves in benzene and concentrated sulfuric acid and the solutions show similar colors to those given by the compound of Example 9.

*Example 11.*—4 parts of Bz-1-ethoxybenzanthrone (8% paste) are intimately mixed with 50 parts of cold water and added to 3000 parts of cold water. 100 parts of acetate silk are scoured in a warm, very dilute solution of soap and ammonia, washed in cold water and entered into a cold dyebath. The dyebath is slowly heated to 80° C. and then kept at 80° C. for ¾ hour, the material being turned in the dye liquor continuously. The material is then lifted, washed in cold water and dried. A bright greenish yellow shade is obtained, which has very good fastness to light, washing, acids, alkalies, burnt gas fumes, and hot pressing.

Bz-1-ethoxybenzanothrone, a new compound, m. p. 139–141° C. is made from Bz-1-hydroxybenzanthrone and diethyl sulphate in nitrobenzene.

*Example 12.*—10 parts of Bz-1-ethoxybenzanthrone (8% paste) are stirred with 25 parts of water and the suspension is mixed with 60 parts of gum Senegal thickening (1:1) and 5 parts of glycerol.

Acetate silk is printed with the above paste, dried, steamed at 100° C. for ½ hour, then washed in water to remove the thickening and dried. A bright greenish-yellow print is obtained.

Other Bz-1-alkoxybenzanthrones may be dyed and printed as in Examples 11 and 12, and the same fastness is obtained. The shades, preparation and properties of some typical ones are given in the following table.

| Bz-1-alkoxybenzanthrone | Melting point | Made by alkylating Bz-1-alkoxybenzanthrone with the following | Color in benzene | Color in sulfuric acid | Shade on acetate silk |
|---|---|---|---|---|---|
| Bz-1-n-butoxy benzanthrone | 120–122° C. | n-Butyl p-toluenesulphonate. | Yellow. | Blue to crimson-red with red fluorescence. | Blue yellow to reddish-yellow. |
| Bz-1-β-chloroethoxy-benzanthrone | 147.5–150° C. | β-Chloroethyl p-toluenesulfonate. | Yellow. | Blue to crimson-red with red fluorescence. | Bright greenish-yellow. |
| Bz-1-β-ethoxyethoxybenzanthrone. | 132.5–133.5° C. | β-Ethoxyethyl p-toluenesulfonate. | Yellow. | Crimson-red with red fluorescence. | Bright yellow. |

As many apparently widely different embodiments of this invention may be made without departing from the spirit and scope thereof, it is to be understood that I do not limit myself to the specific embodiments thereof except as defined in the appended claims.

I claim:
1. The process for coloring materials comprising cellulose acetate which comprises applying thereto an aqueous dispersion of a Bz-1-alkoxybenzanthrone in which the alkoxy group contains from 2 to 5 carbon atoms.
2. The process for coloring materials comprising cellulose acetate which comprises applying thereto an aqueous dispersion of a Bz-1-ethoxybenzanthrone.
3. Cellulose acetate material colored with a Bz-1-alkoxybenzanthrone in which the alkoxy group contains from 2 to 5 carbon atoms.
4. Cellulose acetate material colored with Bz-1-ethoxybenzanthrone.

CECIL SHAW.